(12) United States Patent
Wood et al.

(10) Patent No.: US 11,164,334 B2
(45) Date of Patent: Nov. 2, 2021

(54) DETECTING POSE OF 3D OBJECTS USING A GEOMETRY IMAGE

(71) Applicant: Microsoft Technology Licensing, LLC, Redmond, WA (US)

(72) Inventors: Erroll William Wood, Cambridge (GB); Thomas Joseph Cashman, Cambridge (GB); Andrew William Fitzgibbon, Cambridge (GB); Nikola Milosavljevic, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 102 days.

(21) Appl. No.: 16/370,468

(22) Filed: Mar. 29, 2019

(65) Prior Publication Data

US 2020/0311977 A1 Oct. 1, 2020

(51) Int. Cl.
*G06T 7/73* (2017.01)
*G06T 17/20* (2006.01)
*G06F 9/50* (2006.01)
*G06T 3/40* (2006.01)

(52) U.S. Cl.
CPC .............. *G06T 7/75* (2017.01); *G06F 9/5027* (2013.01); *G06T 3/4007* (2013.01); *G06T 17/20* (2013.01)

(58) Field of Classification Search
CPC ......... G06T 7/75; G06T 3/4007; G06T 17/20; G06T 19/006; G06T 7/74; G06T 2207/10016; G06T 2207/2008; G06T 2207/20084; G06T 2207/30196; G06F 9/5027
See application file for complete search history.

(56) References Cited

U.S. PATENT DOCUMENTS

| 7,265,752 B2* | 9/2007 | Sander et al. .......... G06T 17/20 345/423 |
| 2005/0151733 A1 | 7/2005 | Sander et al. |
| 2006/0267978 A1 | 11/2006 | Litke et al. |
| 2013/0142390 A1* | 6/2013 | Othmezouri ............ G06T 7/251 382/103 |
| 2016/0127715 A1* | 5/2016 | Shotton et al. ...... G06K 9/6202 |

(Continued)

FOREIGN PATENT DOCUMENTS

WO 2018033852 A1 2/2018

OTHER PUBLICATIONS

Christopher Zach, Guillaume Bourmaud. Iterated Lifting for Robust Cost Optimization. BMVC , 2017, London, United Kingdom, hal-01718012 (Year: 2017).*

(Continued)

*Primary Examiner* — Siamak Harandi

(57) ABSTRACT

There is an apparatus for detecting pose of an object. The apparatus comprises a processor configured to receive captured sensor data depicting the object. It also has a memory storing a parameterized model of a class of 3D shape of which the object is a member, where an instance of the model is given as a mapping from a point in a 2D rectangular grid to a 3D position. The processor is configured to compute values of the parameters of the model by calculating an optimization to fit the model to the captured sensor data, using the parametrized mapping. The processor is configured to output the computed values of the parameters comprising at least global position and global orientation of the object.

20 Claims, 9 Drawing Sheets

(56) References Cited

U.S. PATENT DOCUMENTS

2017/0132837 A1* 5/2017 Iverson et al. .......... G06T 17/20
2018/0182166 A1* 6/2018 Shen et al. ................ G06T 7/75

OTHER PUBLICATIONS

"International Search Report and Written Opinion Issued in PCT Application No. PCT/US2020/015768", dated May 12, 2020, 11 Pages.

Huber, et al., "A Multiresolution 3D Morphable Face Model and Fitting Framework", In Proceedings of the 11th International Joint Conference on Computer Vision, Imaging and Computer Graphics Theory and Applications, Feb. 27, 2016, 8 Pages.

Bas, et al., "Fitting a 3D Morphable Model to Edges: A Comparison Between Hard and Soft Correspondences", In Proceedings of Asian Conference on Computer Vision, Nov. 20, 2016, 16 Pages.

Gu, et al., "Geometry Images", In Proceeding of the ACM Transaction on Graphics, vol. 21, Issue 3, Jul. 23, 2002, 7 Pages.

Le, et al., "PointGrid: A Deep Network for 3D Shape Understanding", In Proceedings of IEEE Conference on Computer Vision and Pattern Recognition, Jun. 18, 2018, pp. 9204-9214.

Lehman, et al., "Creative Generation of 3D Objects with Deep Learning and Innovation Engines", In Proceedings of the Seventh International Conference on Computational Creativity, Jun. 27, 2016, 8 Pages.

Massa, Francisco Vitor Suzano, "Relating images and 3D Models with Convolutional Neural Networks", In Doctoral Thesis of Paris-Est University, Apr. 10, 2018, 136 Pages.

Sinha, et al., "SurfNet: Generating 3D Shape Surfaces Using Deep Residual Networks", In Proceedings of IEEE Conference on Computer Vision and Pattern Recognition, Jul. 21, 2017, 10 Pages.

Willis, et al., "Ridge Walking for 3D Surface Segmentation", In Proceedings of Fifth Asian Conference on Computer Vision, May 2010, 7 Pages.

* cited by examiner

NEUTRAL MESH    POSED MESH

SURFACE

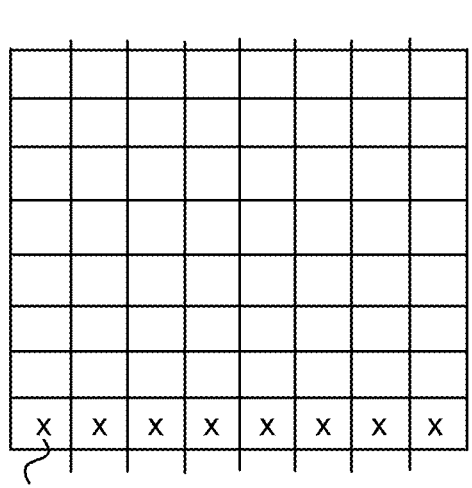
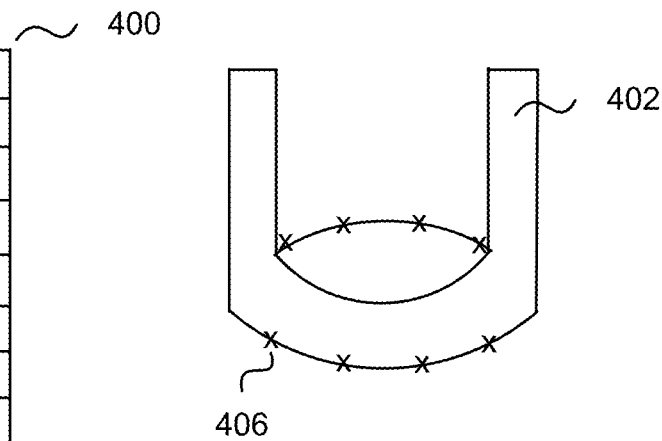
FIG. 4A
FIG. 4B
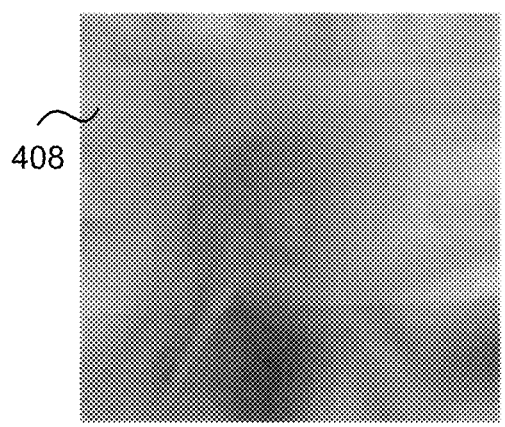
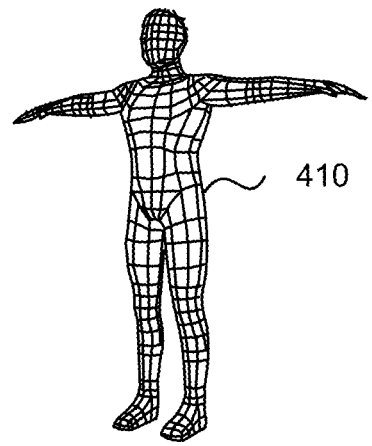
[X, Y, Z]
FIG. 4C
FIG. 4D

DETECTING POSE OF 3D OBJECTS USING A GEOMETRY IMAGE

BACKGROUND

Detecting the pose of a three dimensional (3D) object, such as a human body, human hand, a laptop computer, a coffee mug, a robot, an animal or other object, is challenging to achieve with high levels of accuracy and speed from captured sensor data such as video images or depth camera images or other sensor data. The pose comprises a global position and global orientation of the object and optionally the positions and orientations of one or more joints of the entity where the entity is articulated. Where pose is to be detected using a resource constrained device such as a smart phone, smart watch or augmented reality headset, it is particularly difficult to achieve accuracy and/or robustness. Once the pose has been detected it is extremely useful for downstream applications such as human computer interaction, intelligent sensing and control and other applications. For many of these applications pose is to be detected in real time in order for the technology to work in a practical manner.

The embodiments described below are not limited to implementations which solve any or all of the disadvantages of know apparatus for detecting pose of 3D objects.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is an apparatus for detecting pose of an object. The apparatus comprises at least one processor configured to receive captured sensor data depicting the object. It also has a memory storing a parameterized model of a class of 3D shape of which the object is a member, where an instance of the model is given as a mapping from a 2D parameter space to a 3D shape. The at least one processor is configured to compute values of the parameters of the model by calculating an optimization to fit the model to the captured sensor data, using the mapping. The at least one processor is configured to output the computed values of the parameters comprising at least global position and global orientation of the object.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 4A is a schematic diagram of a geometry image;

FIG. 4B is a schematic diagram of a 3D model of a coffee mug;

FIG. 4C is an example of a geometry image of the polygon mesh model of FIG. 4C;

FIG. 4D is a polygon mesh model of a human body.

Like reference numerals are used to designate like parts in the accompanying drawings.

DETAILED DESCRIPTION

Figure 1:
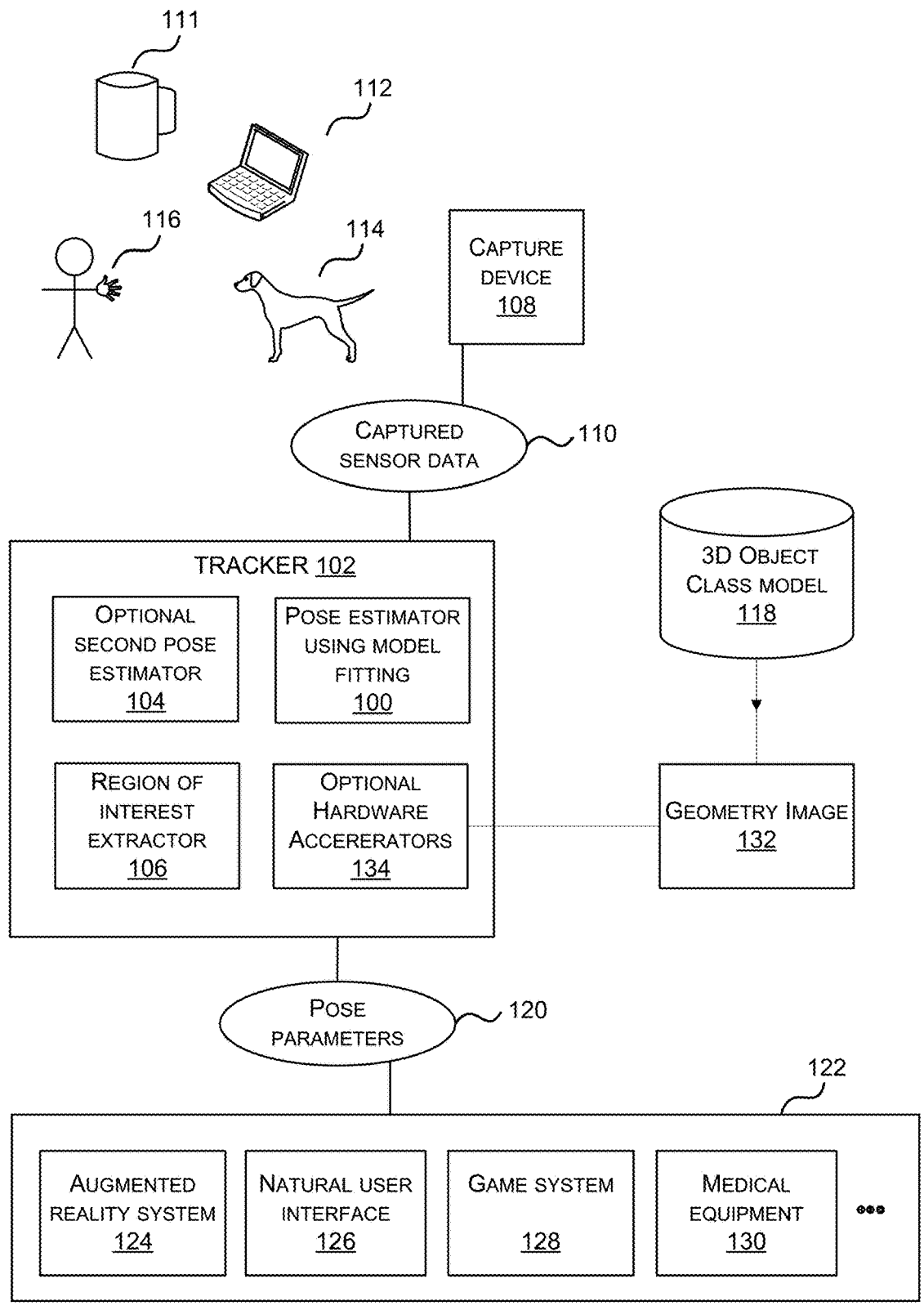
FIG. 1 is a schematic diagram of an apparatus for detecting pose of a 3D object.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

The pose of an object comprises the global position and global orientation of the object and optionally the positions and orientations of one or more joints of the entity where the entity is articulated. The pose therefore has at least six degrees of freedom given by the global position and global orientation and has more than six degrees of freedom where positions and orientations of one or more joints are also included.

In various examples described herein geometry images are used. A geometry image is a mapping from a two dimensional (2D) parameter space to a three dimensional (3D) object or a 3D model of a 3D object. A geometry image is typically stored as a two dimensional array of values holding information about geometry of a 3D shape, and a parametrized class of geometry images can be used to hold information on a class of 3D shapes. Generally speaking a geometry image has the same connectivity as the 3D shape it represents, such that if two points are connected on a surface of the 3D shape they are also connected in the geometry image, however complicated 3D shapes with arbitrary topology can be constructed using a mapping from multiple disjoint regions of the 2D parameter space. Geometry images are well known and are described in detail in Gu, Gortler and Hoppe "Connectivity-free resampling of an arbitrary shape into a regular 2D grid" ACM Trans. Graphics (SIGGRAPH), 21(3), 2002.

A mathematical definition of a geometry image is now given. A geometry image is a 2D image G which can be sampled to return a 3D point in space: $G(u,v) \rightarrow [x,y,z]$. In the case of a square geometry image with resolution SxS, the geometry image is defined mathematically as:

$$G:[0,S)_2 \cap \mathbb{N}^2 \rightarrow \mathbb{R}^3$$

Which is expressed in words as a geometry image G is a function which takes as arguments two coordinates which have values in the range zero to S−1 squared, where S squared is the number of pixels in the geometry image. The coordinates are in a two dimensional parameterization $\mathbb{N}^2$ and the mapping maps to three dimensional real world space denoted $\mathbb{R}^3$.

There are many situations where it is desired to detect the pose of a 3D object and often this is to be done in real time using a resource constrained device such as a smart phone or a wearable computer. The inventors have recognized that the process of detecting pose by model fitting is made more efficient by using a geometry image to represent the 3D model. Previous approaches to detecting pose using model fitting have not used geometry images.

FIG. 1 is a schematic diagram of an apparatus 102 which detects values of pose parameters of a 3D object by computing values of the pose parameters from captured sensor data. The pose parameters comprise a global location and global orientation of the object an optionally positions of one or more joints of the object. The global location and global orientation comprise six degrees of freedom so that there are at least 6 parameters whose values are to be computed. In some cases shape parameter values are also detected.

A capture device 108 such as a color camera, depth camera, a sensor which captures 3D point clouds, or other type of sensor captures data depicting the object in an environment. In the example of FIG. 1 the object is shown as a coffee mug 111, a human hand 116, a laptop computer 112, or a dog 114 but any other object may be used. The object is articulated in some examples, and in other examples it is not articulated. The captured data 110 such as an image or 3D point cloud is input to the apparatus 102 using a wired or wireless link, over a communications network or in other ways. The capture device 108 is at any suitable location, such as room mounted, head worn, vehicle mounted or other.

The apparatus 102 is computer implemented for example in a mobile phone, in a personal computer, in a head worn augmented reality computing device, in a game system, in medical equipment or in other apparatus depending on the application domain concerned. In some examples the apparatus 102 is deployed as a cloud service. The apparatus 102 has access, over a wired or wireless communications link over a network, or from a memory at the apparatus itself, to a store holding a geometry image 132 of the object and optionally a model 118 of the object. For example, the geometry image 132 and model 118 are stored at the mobile phone, medical equipment, game system or other device. The geometry image 132 and model 118 are stored at a remote location accessible to the apparatus 102 over a communications network, in some examples. Combinations of these approaches are possible. The apparatus has an input such as a wireless receiver, a wired communications port or other input to a computing device, which receives captured sensor data from the capture device 108. The capture device 108 sends the captured sensor data to the apparatus 102 over a network in some examples. The apparatus receives captured sensor data from more than one capture device in some examples. The sensor data 110 received at the apparatus is stored in a memory of the apparatus such as the memory described later in this document.

The model 118 is a model of a class of 3D objects such as human hands, human faces, human bodies, or coffee mugs. The apparatus is configured to detect pose of objects in the class of 3D objects of the model. The geometry image 132 is a representation of one instance from the model of the class of 3D objects.

The apparatus computes values of pose parameters 120 of the model 118 which fit the captured data 110. The apparatus is able to do this for a single instance of the captured data 110. In some examples the apparatus computes a stream of values of the pose parameters 120 as a stream of captured data 110 is input to the apparatus 102. In this way the apparatus 102 follows pose of the articulated object as it moves and/or as the capture device 108 moves. The computed values of the pose parameters 120 are input to one or more downstream apparatus 122 such as an augmented reality system 124, a natural user interface 126, a game system 128, medical equipment 130 or others. In the case of an augmented reality system or a robotic system, the computed values of the pose parameters are used to enable an apparatus to interact with the object. In the case of a natural user interface the computed values of the parameters are used to enable the object to interact with a computing device, such where the object is a human body or human hand which is used to make gestures and control a computer.

The apparatus itself comprises a pose estimator which uses model fitting 100, an optional second pose estimator 104 using another type of technology, and optionally a region of interest extractor 106. Optionally the apparatus comprises one or more hardware accelerators such as graphics processing units, tensor processing units (trade mark), or other hardware accelerator.

The example of FIG. 1 is extended in some examples, by detecting values of other parameters of the 3D object, such as shape parameters of the 3D object, in addition to values of pose parameters.

The use of the geometry image of the disclosure leads the apparatus of FIG. 1 to operate in an unconventional manner to achieve efficient detection of pose of 3D objects.

The use of the geometry image of the disclosure improves the functioning of the underlying computing device by reducing the number of branches and loops needed and by enabling a static computation graph to be used such that parallelization is facilitated using hardware accelerators.

In some examples, the functionality of the apparatus 102 is performed, at least in part, by one or more hardware logic components. For example, and without limitation, illustrative types of hardware logic components that are used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs), Tensor Processing Units (TPUs).

Figure 2:
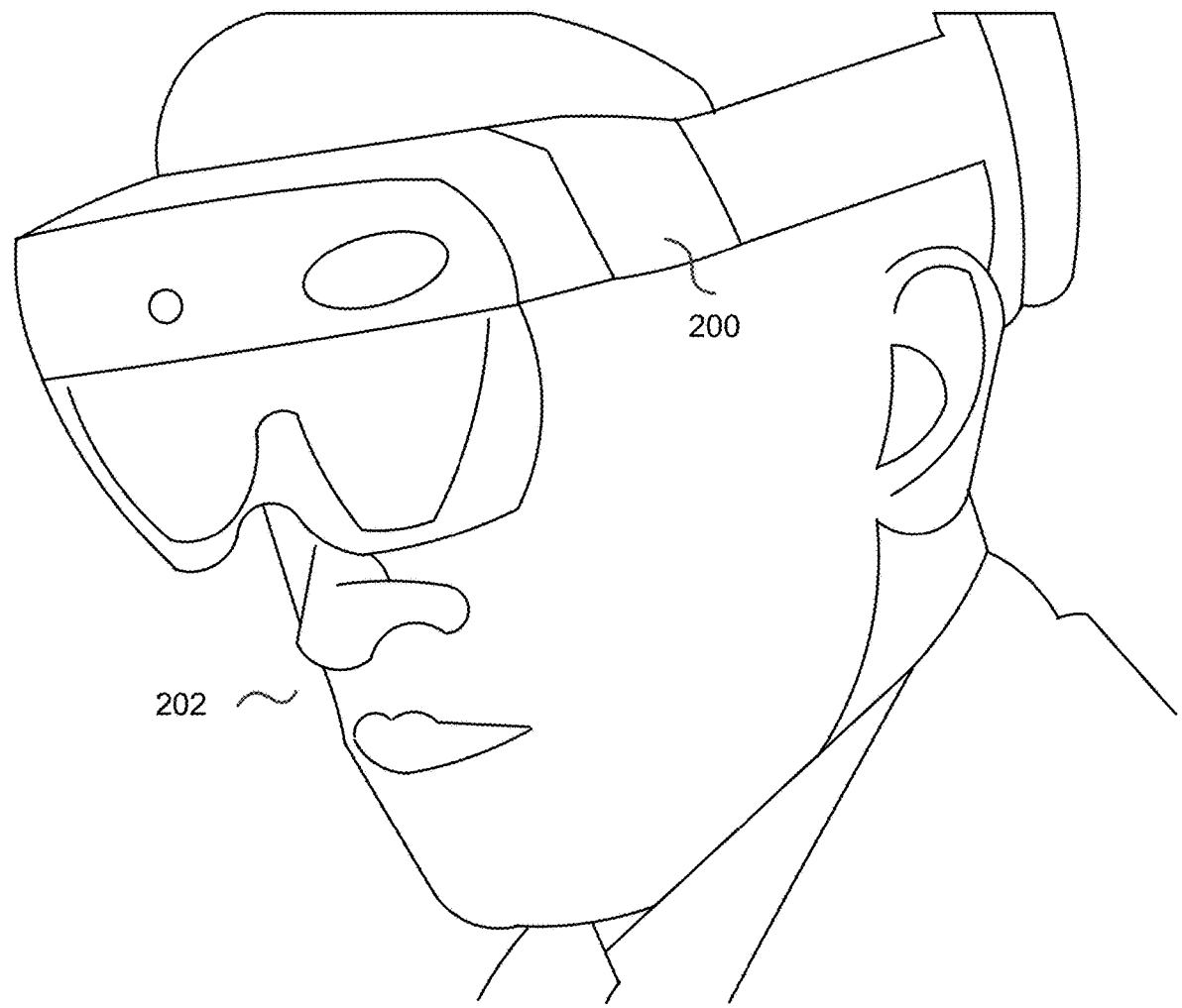
FIG. 2 is a schematic diagram of a person wearing an augmented reality computer.

FIG. 2 shows a person wearing an augmented reality computing device comprising the capture device 108 of FIG. 1. The capture device captures images of the face of the wearer and detects pose of the wearer's face. In this case the pose detector output is sent to a mechanism for human understanding, which computes the intent or emotional state of the wearer from the pose detector output.

Figure 3:
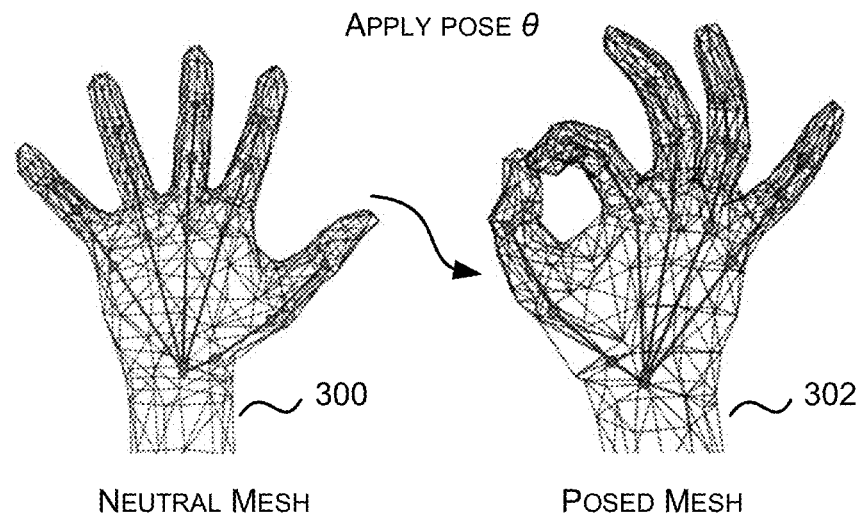
FIG. 3 is a schematic diagram of a neutral triangle mesh model of a human hand, a posed triangle mesh of a human hand, a neutral sphere mesh model of a human hand, a posed sphere mesh model of a human hand, and a posed smooth surface model of a human hand.
Figure 3:
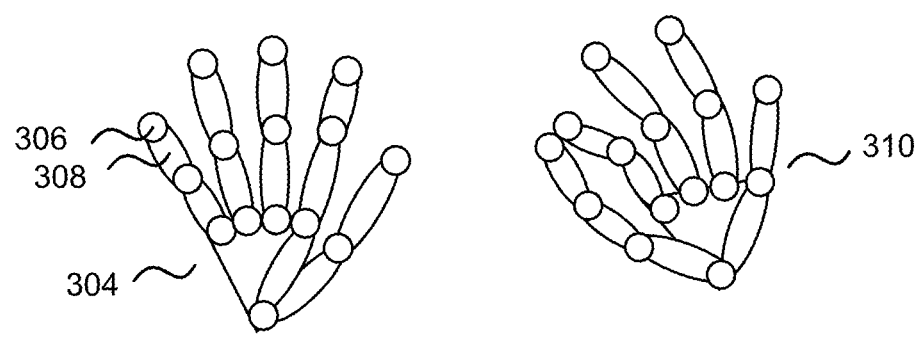
Figure 3:

FIG. 3 is a schematic diagram of a neutral triangle mesh model 300 of a human hand, a posed triangle mesh model 302 of a human hand, a neutral sphere mesh model 304 of a hand, a posed sphere mesh model 310 of a hand and a smooth surface model 304 of a posed human hand. FIG. 3 is included to illustrate a range of types of model which are used in the present technology and it is not intended to be limiting. Whichever type of model is used, a geometry image 132 of the model is available. The geometry image is computed from the model in any suitable manner, such as by cutting an arbitrary mesh along a network of edge paths, and parametrizing the resulting single chart onto a square (as described in Gu et al. referenced above) or, where the model comprises a polygon mesh by using barycentric coordinates as explained in more detail below, or by constructing a geometry image representation ab initio.

In the example of FIG. 3 a neutral polygon mesh model of a human hand is a triangular mesh 300 which is rigged as it contains a representation of a skeleton. When values of pose parameters, such as global position, global orientation and joint positions, of the skeleton are applied to the neutral mesh model 300 a posed mesh model such as 302 is obtained. A polygon mesh model comprises a plurality of polygons arranged to tessellate in order to represent the surface of an object. The surface of a polygon mesh model has discontinuities where the polygons meet.

A smooth surface may be computed from a polygon mesh model, such as the posed triangle mesh model 302 to obtain smooth surface 312. A smooth surface may be computed by repeatedly subdividing the faces of a polygon mesh model until in the limit, a smooth surface is obtained, referred to as the limit surface corresponding to the polygon mesh. Other ways of computing a smooth surface are available. For example, closed-form solutions may be used to evaluate a point on the limit surface or a closely related approximation so that in practice it is not essential to subdivide the faces of the mesh model infinitely.

FIG. 3 shows a neutral sphere mesh model 304 of a human hand. A sphere mesh model is formed from a plurality of spheres 306 linked together by capsules 308 where a capsule is a container that is wrapped around two or more spheres and where the spheres press outwards against the sides of the container. In the example in FIG. 3 the sphere mesh of a hand uses three spheres per digit.

FIG. 4A shows a geometry image schematically as a two dimensional grid 400, each cell 404 comprising a mapping from the two dimensional coordinates of the cell to a three dimensional point on the model. Suppose the geometry image represents a model of a coffee mug as shown in FIG. 4B. The bottom row of the grid of cells in the geometry image maps to points on the rim of the base of the coffee mug such that cell 404 of the geometry image maps to point 406 on the model of the coffee mug.

FIG. 4C shows a geometry image schematically as a two dimensional image 408 where each pixel has a color value (shown in FIG. 4C using grey scale) denoting a three dimensional point by using red to represent the x axis, blue to represent the y axis and green to represent the z axis. In the example of FIG. 4C the geometry image represents a three dimensional mesh model of a human body as depicted in FIG. 4D.

Figure 5A:
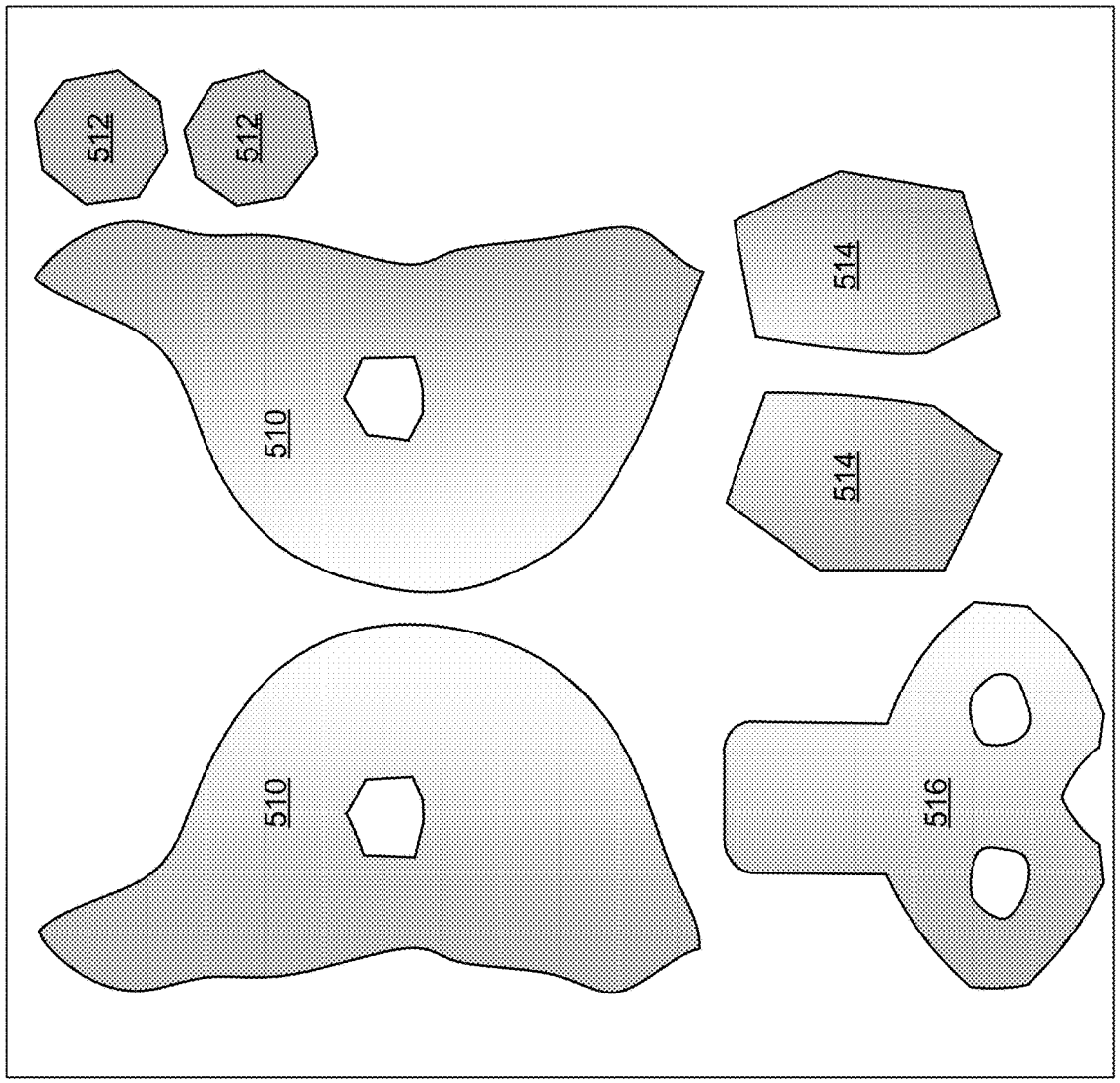
FIG. 5A is a geometry image of the polygon mesh model of FIG. 5B.
Figure 5B:
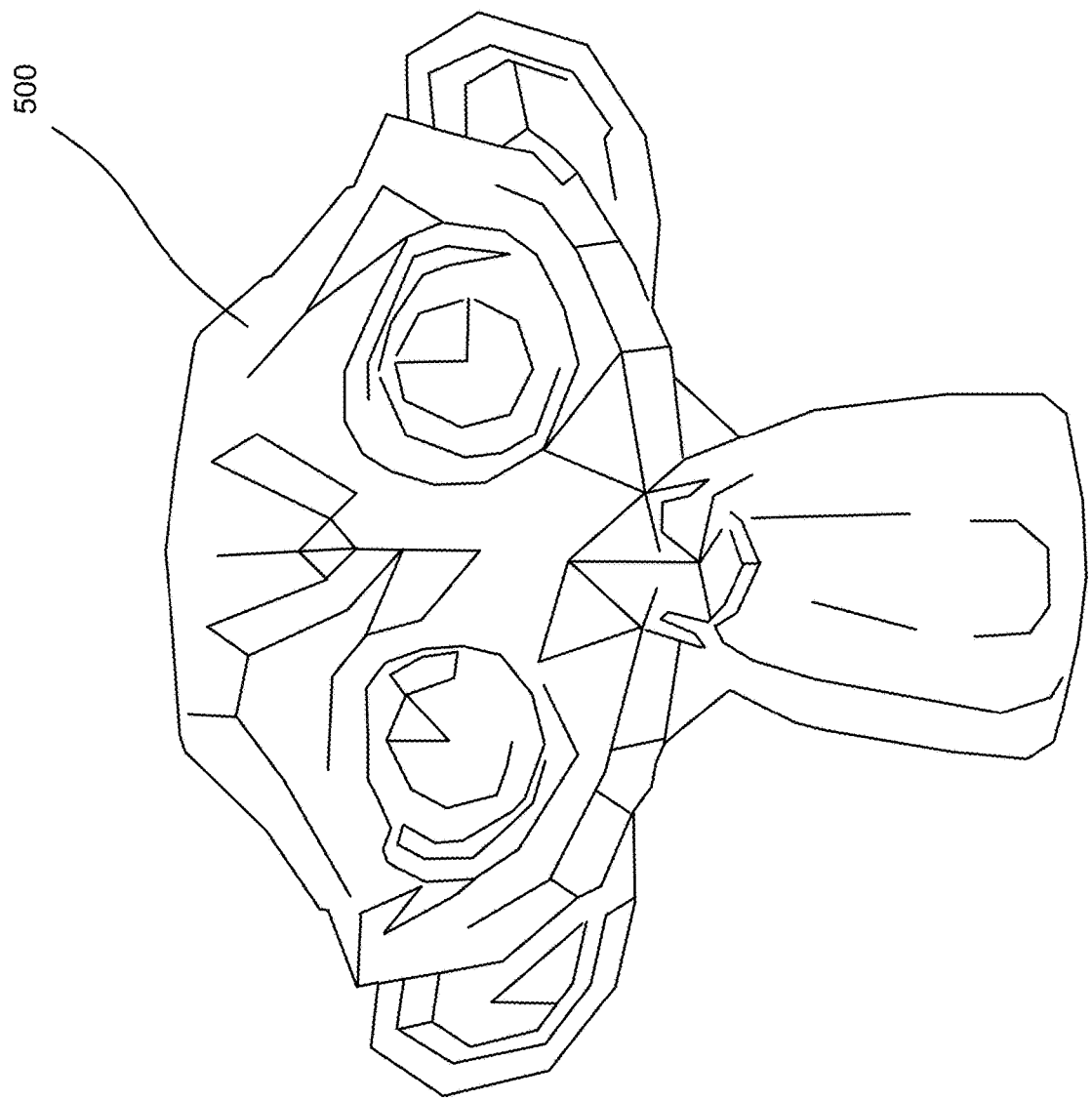
FIG. 5B is a polygon mesh model of a chimpanzee.

FIG. 5A shows a geometry image, again using grey scale rather than color, and in this case the geometry image comprises a plurality of patches. Pixels outside the patches are invalid, that is, they do not map to anything. Pixels within the patches map to points on a 3D model which is the mesh model of FIG. 5B depicting a chimpanzee which is a well-known polygon mesh model. Note that in FIG. 5B only some of the polygons are shown for clarity.

Figure 6:
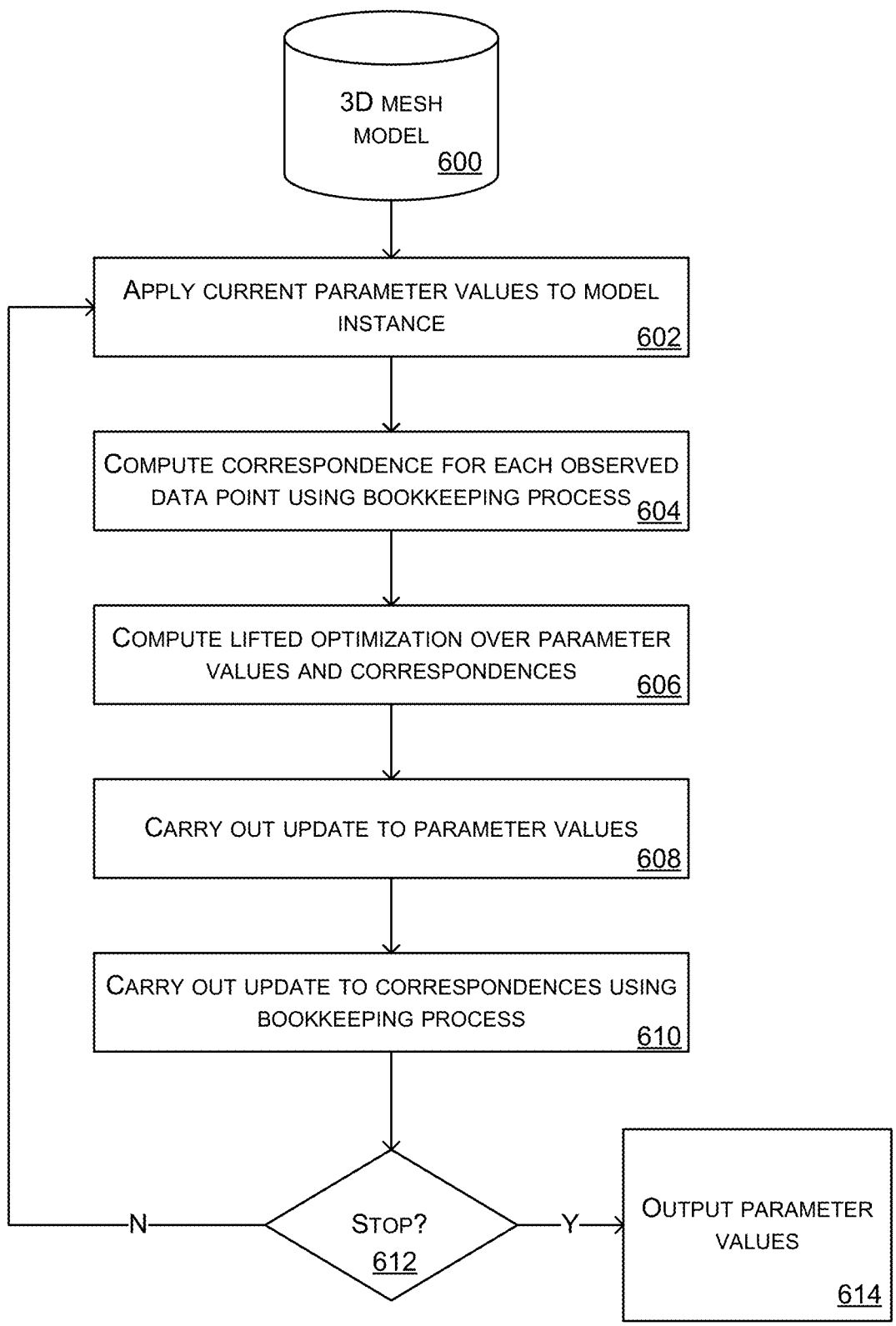
FIG. 6 is a flow diagram of a method of computing pose of a 3D object using a book-keeping process.

FIG. 6 is a flow diagram of a method of detecting pose in the situation where NO geometry image is available. This example is included as background to aid understanding of the technology and to provide a contrast to the method of FIG. 7. In an example, the method is performed by the apparatus 102 of FIG. 1.

The apparatus 102 receives captured data depicting the object to be tracked. For example, the captured data is a 3D point cloud, a depth map, one or more frames of raw time of flight data, color image data or other captured data depicting the object to be tracked. Optionally a region of interest is extracted from the captured data where the region of interest depicts the object to be tracked rather than other parts of the scene or environment in which the object is present. For example, the apparatus uses machine learning technology or image analysis to extract a region of interest of the captured data depicting the object to be tracked. The region of interest may or may not be contiguous.

In some examples, where the region of interest comprises parts of a depth map, the apparatus computes a 3D point cloud by back projecting the region of interest. In some cases a 3D point cloud is already available. In some cases no 3D point cloud is used.

The apparatus applies 602 current values of the model parameters to the model 300. The current values of the model parameters are the values computed for a previous instance of the captured data 110. If there are no previous instances of captured data 110 then the values are initialized to random values or are manually set or are estimated using machine learning techniques.

The apparatus computes 604 a correspondence for each of a plurality of the observed data points in the captured data. In this example, a correspondence is a tuple of values denoted by the symbol u, which specifies a point on a surface of the polygon mesh. A defining function S is stored at the apparatus and is a function which takes as its input a correspondence u and the pose parameters θ. The defining function S computes a 3D position in the world that point u on the polygon mesh surface corresponds to. In an example, polygon indices of the polygon mesh are stored on disk, and the defining function S which is implemented in code, is also stored on disk. The defining function S uses the polygon indices alongside the mesh posing implementation to evaluate the surface by interpolating between the vertices given by the polygon indices. In this way the defining function S is used, together with knowledge of a capture device used to capture the sensor data, to compute the correspondences. Where initial values of the correspondences are already known (from operation 610 which is described later) the initial values are used to influence or simplify the computation of the correspondences at operation 604. The inventors have recognized that because the polygon indices have to be looked up from memory and because book keeping processes are used to keep track of which face of the polygon mesh is currently being used, there are branches and loops in the execution.

Once the correspondences have been computed the apparatus computes a lifted optimization 606 jointly over the parameter values of the model the correspondences. In an example the lifted optimization computes minimization of the following objective function:

$$\min_{\theta, u_1, \ldots u_n} \sum_{i=1}^{n} \psi(\|x_i - S(u_i; \theta)\|) + \psi^{\perp}(\|x_i^{\perp} - S^{\perp}(u_i; \theta)\|)$$

Which is expressed in words as a minimum over the pose parameters θ and n values of the correspondences u of the sum of a robust kernel ψ(.) applied to the magnitude of the difference between a 3D point cloud point $x_i$ and a corresponding 3D surface point $S(u_i; \theta)$, and a different robust kernel $\psi^{\perp}(.)$ applied to the magnitude of the difference between a 3D point cloud normal $x_i^{\perp}$ and a corresponding 3D surface normal $S^{\perp}(u_i; \theta)$. The 3D surface point in this equation lies on a rigged polygon mesh, while the 3D surface normal is an approximation to the geometric normal of a smooth surface such as a subdivision surface. The corresponding 3D surface points given by $S(u_i; \theta)$, and the corresponding 3D surface normals $S^{\perp}(u_i; \theta)$ are efficient to compute. The robust kernels $\psi(.)$ and $\psi^{\perp}(.)$ are a Geman-McClure kernel, a Huber kernel, a Quadratic kernel or other kernel. In examples where other parameters of the 3D object are detected (such as shape parameters), these parameters may be included in the objective function such as the objective function above.

The result of the lifted optimization 606 comprises updates to be added to the parameter values of the model, and updates to be applied to the correspondences.

The apparatus carries out 608 the update to the parameter values of the model by adding the update computed by the lifted optimization to the current values of the model parameters.

The apparatus carries out 610 the update to the correspondences by walking the correspondences along the polygon mesh model by an amount and in a direction specified by the lifted optimization results. The inventors have recognized that book keeping processes are used during the update of the correspondences and as a result there are branches and loops in execution of the process on a computing device. In some cases, the model is a 3D mesh comprising a collection of vertices arranged in triangles. A correspondence on the model is then defined by the triangle in which it exists, and its location within that triangle (a barycentric coordinate). For correspondences to walk over the mesh, the process of FIG. 6 uses book-keeping algorithms to ensure that correspondences are transferred correctly as they travel across triangle boundaries, taking consideration of the different sizes and orientations of the triangles.

However, algorithms for triangle walking are not amenable to large scale optimization methods, e.g. a deep learning framework comprising artificial intelligence accelerators, graphics processing units or other parallel computing units. This is because they require data structures and control flow that cannot be implemented in a static computation graph, as required for auto-differentiation in many optimization frameworks. Also because each correspondence is processed independently, with a different number of computations depending on the size of the update applied to the correspondence, it is difficult to encode the algorithm as a static computation graph. As a result, previous implementations of lifted optimization have not been able to take advantage of the highly parallel and efficient nature of deep learning optimization frameworks.

The apparatus checks whether the process of FIG. 6 is to stop or to continue by returning to operation 602. If convergence has been reached, since the amount of the updates at operations 608 and 610 was below a threshold or according to some other stopping criterion, then the process stops. If a specified number of iterations of the process of FIG. 6 have been carried out then the process stops. When the process stops it outputs 614 the parameter values of the model and the values of the correspondences.

It is recognized herein that by using a geometry image to represent the model, it is possible to compute the parameter values of the model and the values of the correspondences more efficiently. The use of a geometry image reduces the number of branches and loops in the execution and thus gives improved efficiency.

Figure 7:
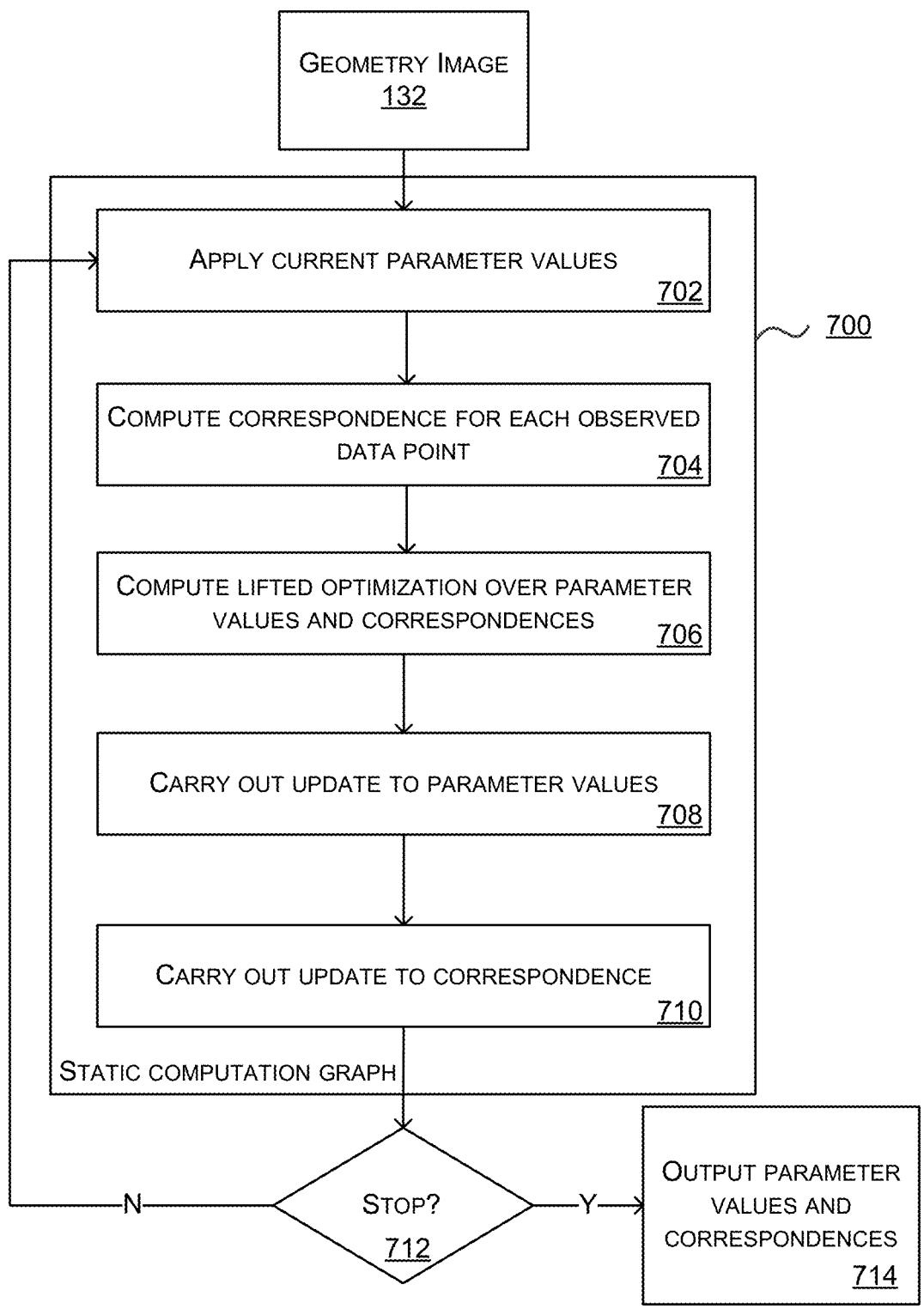
FIG. 7 is a flow diagram of a method of computing pose of a 3D object using a geometry image and without the need for a book-keeping process.

FIG. 7 is a method of operation performed by the apparatus of FIG. 1 and where a geometry image 132 is used to give efficiency. The apparatus receives captured data depicting the object to be tracked. For example, the captured data is a 3D point cloud, a depth map, one or more frames of raw time of flight data, color image data or other captured data depicting the object to be tracked. Optionally a region of interest is extracted from the captured data where the region of interest depicts the object to be tracked rather than other parts of the scene or environment in which the object is present. For example, the apparatus uses machine learning technology or image analysis to extract a region of interest of the captured data depicting the object to be tracked. The region of interest may or may not be contiguous.

In some examples, where the region of interest comprises parts of a depth map, the apparatus computes a 3D point cloud by back projecting the region of interest. In some cases a 3D point cloud is already available. In some cases no 3D point cloud is used.

The apparatus applies 702 current values of the model parameters to the model 300 and then computes a geometry image from the model. The current values of the model parameters are the values computed for a previous instance of the captured data 110. If there are no previous instances of captured data 110 then the values are initialized to random values or are manually set or are estimated using machine learning techniques.

The apparatus computes 704 a correspondence for each of a plurality of the observed data points in the captured data. The correspondences are computed directly by finding, for an observed data point, a point on the polygon mesh which is closest to that observed data point. Polygon indices alongside the mesh posing implementation are used to evaluate the surface of the polygon mesh by interpolating between the vertices given by the polygon indices. Where initial values of the correspondences are already known (from operation 310 which is described later) the initial values are used to influence or simplify the computation of the correspondences at operation 704.

Once the correspondences have been computed the apparatus computes a lifted optimization 706 jointly over the parameter values of the model the correspondences. In an example the lifted optimization computes minimization of the following objective function:

$$\min_{\theta, u_1, \ldots u_n} \sum_{i=1}^{n} \psi(\|x_i - S(u_i; \theta)\|) + \psi^{\perp}(\|x_i^{\perp} - S^{\perp}(u_i; \theta)\|)$$

Which is expressed in words as a minimum over the pose parameters $\theta$ and n values of the correspondences u of the sum of a robust kernel $\psi(.)$ applied to the magnitude of the difference between a 3D point cloud point $x_i$ and a corresponding 3D surface point $S(u_i; \theta)$, and a different robust kernel $\psi^{\perp}(.)$ applied to the magnitude of the difference between a 3D point cloud normal $x_i^{\perp}$ and a corresponding 3D surface normal $S^{\perp}(u_i; \theta)$. The defining function S is now defined as $G(u,v) \rightarrow [x,y,z]$ since the geometry image is being used. The 3D surface point in this equation lies on a polygon mesh, while the 3D surface normal is an approximation to the geometric normal of a smooth surface such as a subdivision surface. The corresponding 3D surface points are given by $S(u_i; \theta)$, and the corresponding 3D surface normals by $S^{\perp}(u_i; \theta)$. The robust kernels $\psi(.)$ and $\psi^{\perp}(.)$ are a Geman-McClure kernel, a Huber kernel, a Quadratic kernel or other kernel. In examples where other parameters of the 3D object are detected (such as shape parameters), these parameters may be included in the objective function such as the objective function above.

The result of the lifted optimization 706 comprises updates to be added to the parameter values of the model, and updates to be applied to the correspondences.

The apparatus carries out 708 the update to the parameter values of the model by adding the update computed by the lifted optimization to the current values of the model parameters.

The apparatus carries out 710 the update to the correspondences by walking the correspondences in the geometry image by an amount and in a direction specified by the lifted optimization results and by sampling the geometry image using any smooth interpolation, such as bilinear sampling.

The apparatus checks whether the process of FIG. 7 is to stop or to continue by returning to operation 702. If convergence has been reached, since the amount of the updates at operations 708 and 710 was below a threshold, then the process stops. If a specified number of iterations of the process of FIG. 7 have been carried out then the process stops. When the process stops it outputs 714 the parameter values of the model and the values of the correspondences.

By using the geometry image to represent the model the process of FIG. 7 does not contain the branches and loops which are present in the process of FIG. 6. The process of FIG. 7 is thus encodable as a static computation graph as indicated in FIG. 7. The term "static computation graph" is a well-known term in computer science and refers to a type of a representation of a mathematical function using nodes connected by edges and without loops and branches in the graph. A static computation graph is a useful way of representing a computation because it facilitates parallel implementation of the computation since different parts of the graph are computable in parallel.

The process of FIG. 7 is encoded, in whole or in part, using one or more static computation graphs. The static computation graphs are then executed using parallelization to achieve efficiency. In some examples, hardware accelerators such as graphics processing units, or neural network processing units, are used to execute the static computation graph(s). In this way significant efficiencies are gained. In some examples, the hardware accelerator is deployed in a resource constrained device such as a smart phone, wearable computer or other resource constrained device, and the use of the present technology enables real time pose detection to be achieved.

In the example of FIG. 7 there is an implementation of lifted optimization that is encoded in a static computation graph. In an example, this is done by parameterizing the model surface as a geometry image which is smoothly sampled using bilinear interpolation.

As mentioned above, a geometry image is a 2D image G which can be sampled to return a 3D point in space: $G(u,v) \rightarrow [x,y,z]$. Assume G locally shares the same connectivity as the model surface, i.e. if two points are locally connected in 3D space, they are also locally connected in the 2D geometry image. For each data point d, assign a correspondence $(u_d, v_d)$ in G. For lifted optimization, the correspondences are able to slide around in u, v space, so they can "walk" over the surface of the model.

In practice, G is a discrete 2D image, where each pixel's value is a 3D point. So, given a square image of resolution S×S, the geometry image is $G:[0,S)^2 \cap \mathbb{N}^2 \rightarrow \mathbb{R}^3$ If the apparatus samples G with nearest-neighbor sampling, the surface of the model will not be smooth. Instead, it will be piecewise constant, and its gradient everywhere will be zero. This is not suitable for lifted optimization since the correspondences will have no gradients to "pull" them around in u, v space.

Instead, the apparatus samples G with bilinear interpolation, taking the weighted average of four values in the discrete geometry image, rather than only one. This bilinearly-sampled image is $G':[0,S)^2 \cap \mathbb{R}^2 \rightarrow \mathbb{R}^3$.

$$G'(u,v) = \lambda_a G(u_0,v_0) + \lambda_b G(u_0,v_1) + \lambda_c G(u_1,v_0) + \lambda_d G(u_1,v_1)$$

Where u0, v0, u1, and v1 are four integer coordinate values around u, v:

$$u_0 = \lfloor u \rfloor, v_0 = \lfloor v \rfloor, u_1 = u_0+1, \text{ and } v_1 = v_0+1$$

And the per-point weights are given by:

$$\lambda_a = (u_1-u)(v_1-v), \lambda_b = (u_1-u)(v-v_0)$$

$$\lambda_c = (u-u_0)(v_1-v), \lambda_d = (u-u_0)(v-v_0)$$

With bilinear sampling, the surface is now continuous, and the correspondence variables have non-zero gradients with respect to their location in G'. They can slide around in u, v space as part of a lifted optimization step. Since bilinear interpolation does not require any special data structure or control flow, it is insertable into a static computation graph. Note that the technology is not limited to the use of lifted optimization as other types of optimization are used in some examples.

This approach is extended to fit deformable and articulated shapes. Let the underlying model be defined as a set of n vertices $V \in \mathbb{R}^{n \times 3}$ connected by m triangles, with vertex indices $F \in \mathbb{N}^{m \times 3}$. V is deformed with linear bases, vertex skinning, or other computer graphics techniques. Consider V and F as mappings $V: [0,n) \cap \mathbb{N} \rightarrow \mathbb{R}^3$ and $F: [0, m) \cap \mathbb{N} \rightarrow [0,n)^3 \cap \mathbb{N}^3$. Define G as:

$$G(u,v) = F_{bary}(u,v) \cdot V(F(F_{idx}(u,v))) \text{ where}$$

$F_{bary}: [0,S)^2 \rightarrow \mathbb{R}^3$ is an image where each pixel maps to three barycentric coordinates $F_{idx}: [0,S)^2 \rightarrow [0,m)$ is an image where each pixel maps to a triangle index This is sampled in a bilinear fashion with G' to produce a smooth surface.

The inventors have carried out empirical testing of the technology of FIG. 6 (using no hardware accelerator) and the technology of FIG. 7 (using the Microsoft Cognitive Toolkit (trade mark) hardware accelerators). It is found that there is a one hundred times speed up in time per frame (time to compute the pose parameters from one frame of captured sensor data and a 60 times improvement in memory consumption.

Figure 8:
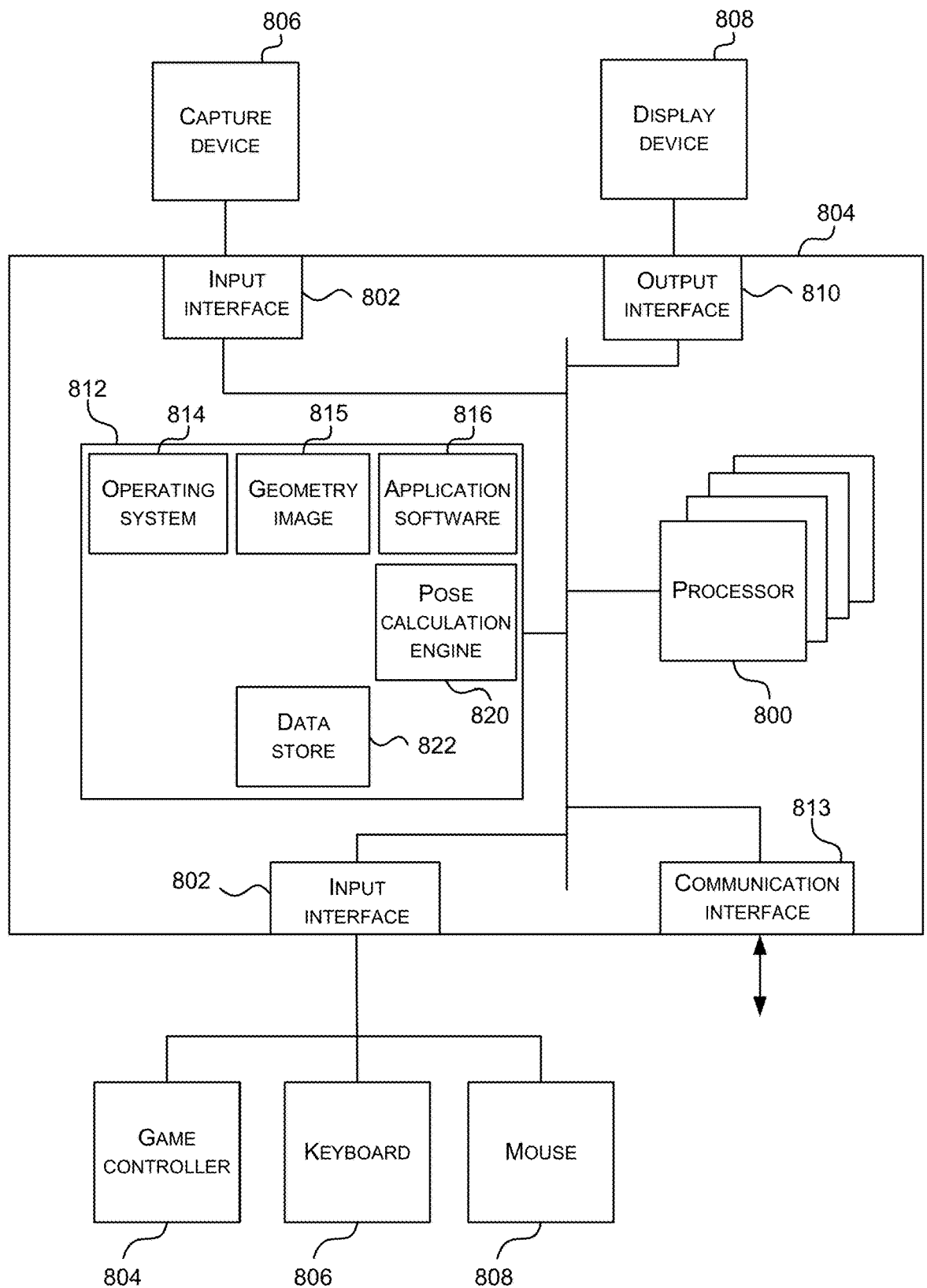
FIG. 8 illustrates an exemplary computing-based device in which embodiments of a pose detector are implemented.

FIG. 8 illustrates various components of an exemplary computing-based device 804 which may be implemented as any form of a computing and/or electronic device, and in which embodiments of systems for calculating pose of objects from observed data such as one or more images may be implemented.

Computing-based device 804 comprises one or more processors 800 which may be microprocessors, controllers, graphics processing units, parallel processing units, or any other suitable type of processors for processing computing executable instructions to control the operation of the device in order to calculate pose of an object from observed data such as one or more images. In some examples, for example where a system on a chip architecture is used, the processors 800 may include one or more fixed function blocks (also referred to as accelerators) which implement a part of the method of model fitting and pose calculation in hardware (rather than software or firmware).

The computing-based device 804 comprises one or more input interfaces 802 arranged to receive and process input from one or more devices, such as user input devices (e.g.

capture device 806, a game controller 824, a keyboard 826 and/or a mouse 828). This user input may be used to control software applications or games executed on the computing device 804.

The computing-based device 804 also comprises an output interface 810 arranged to output display information to a display device 808 which can be separate from or integral to the computing device 804. The display information may provide a graphical user interface. In an example, the display device 808 may also act as the user input device if it is a touch sensitive display device. The output interface may also output data to devices other than the display device, e.g. a locally connected printing device.

The computer executable instructions may be provided using any computer-readable media that is accessible by computing based device 804. Computer-readable media may include, for example, computer storage media 812 such as memory and communications media. Computer storage media 812, such as memory 812, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media 812 (memory) is shown within the computing-based device 804 it will be appreciated that the storage may be distributed or located remotely and accessed via a network or other communication link (e.g. using communication interface 813).

Platform software comprising an operating system 814 or any other suitable platform software may be provided at the computing device 804 to enable application software 816 to be executed on the device. A data store 822 is provided to store data such as parameter values, correspondences, captured sensor data and other data. A pose calculation engine 812 implements the method of any of FIGS. 6 and 7. A geometry image 815 is stored at the device.

Alternatively or in addition to the other examples described herein, examples include any combination of the following:

Clause A. An apparatus for detecting pose of an object, the apparatus comprising:
  at least one processor configured to receive captured sensor data depicting the object;
  a memory storing a parameterized model of a class of 3D shape of which the object is a member, where an instance of the model is a mapping from a 2D parameter space to a 3D shape;
  the at least one processor configured to compute values of the parameters of the model by calculating an optimization to fit the model to the captured sensor data, using the mapping, and
  the at least one processor configured to output the computed values of the parameters comprising at least global position and global orientation of the object. By using the mapping efficiencies are gained since there are fewer branches and loops in the execution. As a result the apparatus is deployable on a resource constrained device.

Clause B The apparatus of clause A wherein the computed values of the parameters are used to control any of: an augmented reality apparatus, a user interface, a game system, a medical apparatus, a robotic apparatus.

Clause C The apparatus of clause A or clause B wherein the mapping is a geometry image which is a two dimensional array of values storing information about geometry of an instance of the class of 3D shape. Use of a geometry image is a practical and effective representation which enables efficiencies to be gained without loss of accuracy.

Clause D The apparatus of clause A or clause B wherein the mapping is a geometry image being an image which has the same connectivity as an instance of the class of 3D shape such that if two points are connected on a surface of the 3D shape they are also connected in the geometry image.

Clause E The apparatus of any preceding clause wherein at least part of the optimization is encoded in a static computation graph. By encoding with a static computation graph the technology becomes executable at least in part using hardware accelerators.

Clause F The apparatus of any preceding clause wherein the optimization is computed, at least in part, using one or more hardware accelerators. In this way significant efficiencies are gained.

Clause G The apparatus of any preceding clause wherein the processor is configured to compute the optimization as a lifted optimization whereby parameters of the model are optimized jointly with variables representing correspondences between the captured sensor data and the model. Use of lifted optimization enables a practical working solution.

Clause H The apparatus of any preceding clause wherein the processor is configured to use the mapping, comprising a geometry image, and to compute samples from the geometry image by sampling with smooth interpolation.

Clause I The apparatus of clause H wherein the sampling is sampling with bilinear interpolation.

Clause J The apparatus of any preceding clause wherein the processor is configured to compute the mapping using an image where each pixel maps to a polygon index of the polygon mesh. This provides an effective way to obtain the geometry image.

Clause K The apparatus of clause J wherein the processor is configured to compute the mapping using an image where each pixel maps to a plurality of barycentric coordinates. This provides an effective way to obtain the geometry image.

Clause L The apparatus of any preceding clause wherein the processor is configured to compute the optimization using an evaluation process and an update process, and to use the mapping during the update process to update values of variables representing correspondences between the captured sensor data and the model. This gives efficiencies in the update process.

Clause M The apparatus of any preceding clause wherein the processor is configured to compute the optimization using an evaluation process and an update process, and to use the mapping during the evaluation process. This gives efficiencies in the evaluation process.

Clause N The apparatus of any preceding clause wherein the parameters of the model include shape parameters.

Clause O A computer-implemented method of detecting pose of an object, the method comprising:

receiving, at a processor, captured sensor data depicting the object;

storing, at a memory, a parameterized model of a class of 3D shape of which the object is a member, where an instance of the model is a mapping from a 2D parameter space to a 3D shape;

computing values of the parameters of the model by calculating an optimization to fit the model to the captured sensor data, using the mapping, and outputting the computed values of the parameters comprising at least global position and global orientation of the object.

Clause P The method of clause O comprising storing the mapping at the memory as a geometry image which is a two dimensional array of values storing information about geometry of an instance of the class of 3D shape.

Clause Q The method of clause O comprising encoding at least part of the optimization as a static computation graph and executing the static computation graph using a hardware accelerator.

Clause R An apparatus for detecting pose of an object, the apparatus comprising:

a processor configured to receive captured sensor data depicting the object;

a memory storing a geometry image comprising a mapping from a 2D parameter space to an instance of a parameterized model of a class of 3D shape of which the object is a member;

the processor configured to compute values of the parameters of the model by calculating an optimization to fit the model to the captured sensor data, using the geometry image, and the processor configured to output the computed values of the parameters comprising at least global position and global orientation of the object.

Clause S The apparatus of clause R wherein the processor is configured to compute the geometry image from the parameterized model.

Clause T The apparatus of clause R or clause S comprising a hardware accelerator which executes the optimization using the geometry image.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. An apparatus for detecting pose of an object, the apparatus comprising:
   at least one processor configured to receive captured sensor data depicting the object;
   a memory storing a parameterized model of a class of 3D shape of which the object is a member, wherein an instance of the model is a mapping from a 2D parameter space to a 3D shape, and the mapping comprises a geometry image;

the at least one processor configured to compute values of parameters of the model at least by:
calculating an optimization to fit the model to the captured sensor data, the optimization comprising a lifted optimization,
the calculating including reducing loops or branches using the geometry image,
the calculating further including encoding at least part of the optimization as a static computation graph, and
executing the static computation graph using parallelization, and the at least one processor further configured to output the computed values of the parameters comprising at least global position and global orientation of the object.

2. The apparatus of claim 1 wherein the computed values of the parameters are used to control any of: an augmented reality apparatus, a user interface, a game system, a medical apparatus, a robotic apparatus.

3. The apparatus of claim 1 wherein the geometry image comprises a two dimensional array of values storing information about geometry of an instance of the class of 3D shape.

4. The apparatus of claim 1 wherein the geometry image comprises an image which has the same connectivity as an instance of the class of 3D shape such that if two points are connected on a surface of the 3D shape they are also connected in the geometry image.

5. The apparatus of claim 1 wherein the geometry image is computed, at least in part, from the parameterized model.

6. The apparatus of claim 1 wherein the optimization is computed, at least in part, using one or more hardware accelerators.

7. The apparatus of claim 1 wherein parameters of the model are optimized jointly with variables representing correspondences between the captured sensor data and the model, and the static computation graph has no loops or branches.

8. The apparatus of claim 1 wherein the processor is configured to use the mapping, and to compute samples from the geometry image by sampling with smooth interpolation.

9. The apparatus of claim 8 wherein the sampling is sampling with bilinear interpolation.

10. The apparatus of claim 9 wherein the processor is configured to compute the mapping using an image wherein each pixel maps to a polygon index of a polygon mesh.

11. The apparatus of claim 10 wherein the processor is configured to compute the mapping using an image where each pixel maps to a plurality of barycentric coordinates.

12. The apparatus of claim 1 wherein the processor is configured to compute the optimization using an evaluation process and an update process, and to use the mapping during the update process to update values of variables representing correspondences between the captured sensor data and the model.

13. The apparatus of claim 1 wherein the processor is configured to compute the optimization using an evaluation process and an update process, and to use the mapping during the evaluation process.

14. The apparatus of claim 1 wherein the parameters of the model include shape parameters.

15. A computer-implemented method of detecting pose of an object, the method comprising:
receiving, at a processor, captured sensor data depicting the object;
storing, at a memory, a parameterized model of a class of 3D shape of which the object is a member, wherein an instance of the model is a mapping from a 2D parameter space to a 3D shape, and the mapping comprises a geometry image;
computing values of parameters of the model at least by:
calculating an optimization to fit the model to the captured sensor data, the optimization comprising a lifted optimization,
the calculating including reducing loops or branches using the geometry image,
the calculating further including encoding at least part of the optimization is encoded as a static computation graph, and
executing the static computation graph is executed using parallelization, and
outputting the computed values of the parameters comprising at least global position and global orientation of the object.

16. The method of claim 15 comprising storing the mapping at the memory as the geometry image which comprises a two dimensional array of values storing information about geometry of an instance of the class of 3D shape.

17. The method of claim 15 comprising executing the static computation graph using a hardware accelerator.

18. An apparatus for detecting pose of an object, the apparatus comprising:
a processor configured to receive captured sensor data depicting the object;
a memory storing a geometry image comprising a mapping from a 2D parameter space to an instance of a parameterized model of a class of 3D shape of which the object is a member;
the processor configured to compute values of parameters of the model at least by:
calculating an optimization to fit the model to the captured sensor data, the optimization comprising a lifted optimization,
the calculating including reducing loops or branches using the geometry image,
the calculating further including encoding at least part of the optimization as a static computation graph, and
executing the static computation graph using parallelization; and
the processor further configured to output the computed values of the parameters comprising at least global position and global orientation of the object.

19. The apparatus of claim 18 wherein the processor is configured to compute the geometry image from the parameterized model.

20. The apparatus of claim 18 comprising a hardware accelerator which executes the optimization using the geometry image.

* * * * *